US008927933B1

(12) United States Patent
Feng

(10) Patent No.: US 8,927,933 B1
(45) Date of Patent: Jan. 6, 2015

(54) DUAL-BAND WIDE-ANGLE ABSORBER/THERMAL EMITTER

(75) Inventor: Simin Feng, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 373 days.

(21) Appl. No.: 13/398,579

(22) Filed: Feb. 16, 2012

(51) Int. Cl.
*G01J 5/00* (2006.01)

(52) U.S. Cl.
USPC ...................................................... 250/338.1

(58) Field of Classification Search
USPC ...................................................... 250/338.1
See application file for complete search history.

(56) References Cited

PUBLICATIONS

Baldi et al., Mg—Ti—H thin films as switchable solar absorbers, 2008, International Journal of Hydrogen Energy, vol. 33, pp. 3188-3192.*
Nefzaoui et al., Selective emitters design and optimization for thermophotovoltaic applications, Feb. 15, 2012, pp. 1-12.*
Alu et al., Epsilon-Near-Zero (ENZ) Metamaterials and Electromagnetic Sources: Tailoring the Radiation Phase Pattern, Apr. 15, 2007, Physical Review B, vol. 75, pp. 155410-1 to 155410-13.*
Feng et al., Perfect Absorption in Ultrathin Epsilon-Near-Zero Metamaterials Induced by Fast-Wave Non-Radiative Modes, Dec. 6, 2011, Physics Optics, pp. 1-4.*
Huang et al., Multi-Band and Polarization Insensitive Metamaterial Absorber, Jan. 2011, Progress in Electromagnetics Research, vol. 113, pp. 103-110.*
Ni et al., Loss-compensated and active hyperbolic metamaterials, Nov. 23, 2011, Optics express, Vo;. 19, pp. 25242-25254.*
Silveirinha et al., Design of matched zero-index metamaterials using nonmagnetic inclusions in epsilon-near-zero media, Feb. 2007, Physics Review B, vol. 75, pp. 075119-1 to 075119-10.*
Vial et al., Improved analytical fit of gold dispersion: Application to the modeling of extinction spectra with a finite-difference time-domain method, Feb. 23, 2005, Physical Review B, vol. 71, pp. 085416-1 to 085416-7.*

* cited by examiner

*Primary Examiner* — Christine Sung
(74) *Attorney, Agent, or Firm* — James M. Saunders

(57) ABSTRACT

A dual-band wide-angle absorber/thermal emitter includes at least one primary layer having a permittivity described by the Drude-Lorentz model. At least one reflective secondary layer is associated with the primary layer.

14 Claims, 2 Drawing Sheets

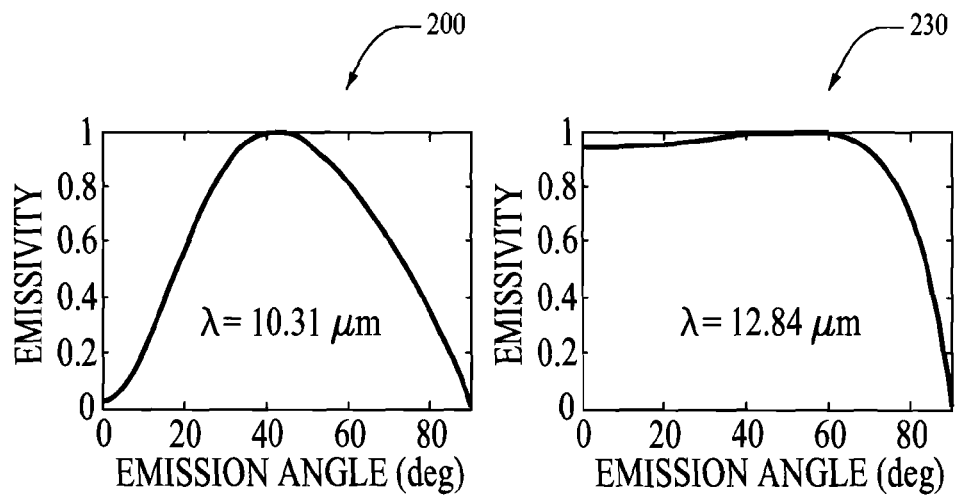
FIG. 2A
FIG. 2B
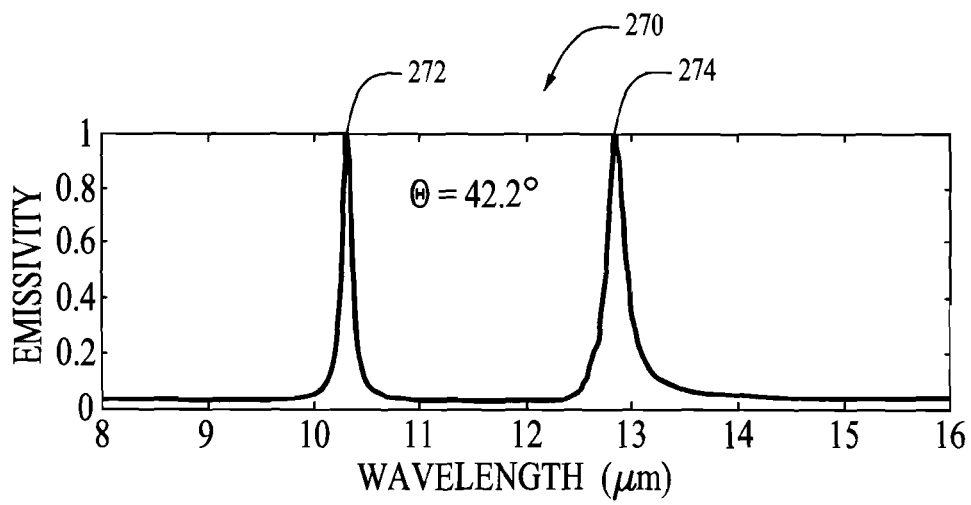
FIG. 2C

DUAL-BAND WIDE-ANGLE ABSORBER/THERMAL EMITTER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to absorbers and emitters, and more particularly, to a new way to achieve dual-band wide-angle absorption or thermal emission in thin materials.

BRIEF DESCRIPTION OF THE DRAWINGS

FIG. 2A is a graphical comparison of emissivity as a function of emission angle at the perfect emission wavelength of the shorter wavelength band, according to embodiments of the invention.

FIG. 2B is a graphical comparison of emissivity as a function of emission angle at the perfect emission wavelength of the longer wavelength band, according to embodiments of the invention.

FIG. 2C is a graphical comparison of emissivity as a function of wavelength at one of the perfect emission angles, according to embodiments of the invention.

Figure 1:
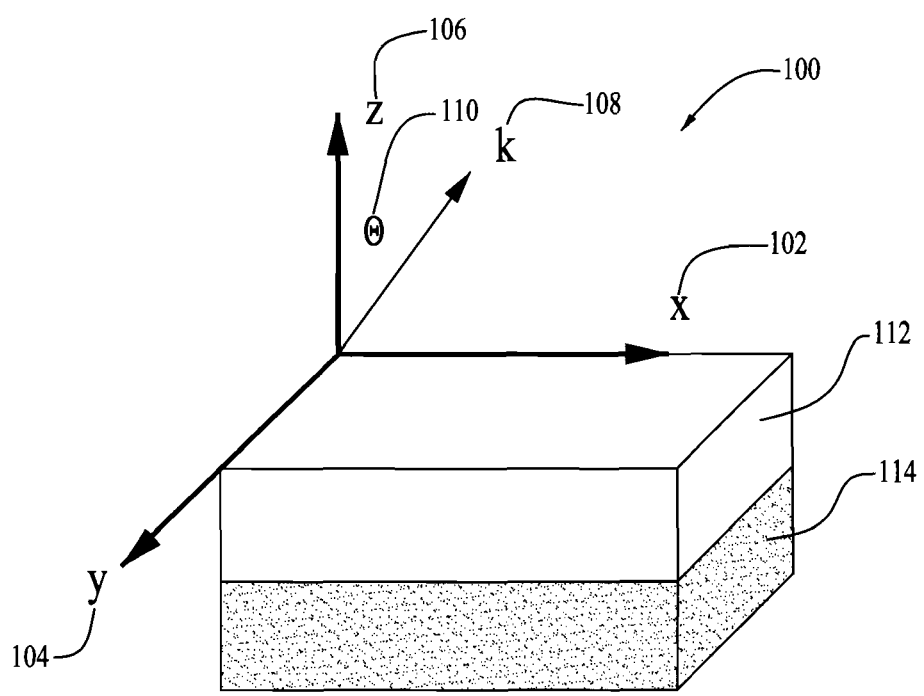
FIG. 1 is a perspective view of a dual-band wide-angle absorber/thermal emitter, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to absorbers and emitters, and more particularly, to a new way to achieve dual-band wide-angle absorption or thermal emission in thin materials.

Currently, absorbers are thick and are limited by operating wavelengths. Most of the current absorbers or thermal emitters are single band. Current dual-band absorbers/thermal emitters are thick and have small acceptance angles. Embodiments of the invention are based on bi-layer structures composed a highly or totally reflective natural or engineered material substrate and other natural or engineered dielectric materials with permittivity described by the Drude-Lorentz model. A person having ordinary skill in the art will recognize the Drude-Lorentz model as an electrical conduction model explaining transport properties of electrons in materials.

The composite structure associated with embodiments of the invention yields dual-band wide-angle emission or absorption around the Drude-Lorentz resonance for thin overall composite structures. Two thermal emission or absorption bands coexist when the material is described by the Drude-Lorentz model.

Various absorbers and thermal emitters are in high demand for thermal sensing and energy harvesting applications. Thermal radiation is characterized by broadband, incoherent, and quasi-isotropic due to the intrinsic random nature of thermal fluctuations. To maximize conversion efficiency of photovoltaic (PV) cells, it is desirable to have a narrow-band radiation that matches with electronic transition of PV cells. On the other hand, the control of emission spectrum and direction also has important applications. In the past few years, there has been increasing attention on patterning surface microstructures, such as gratings, photonic bandgaps, microcavities, and metamaterials, to reduce radiation bandwidth and to modify surface emission characteristics. Dual band wide-angle absorption/thermal emission is a desired feature for many applications, such as IR sensors and integrated multifunctional devices.

Although embodiments of the invention are described in considerable detail, including references to certain versions thereof, other versions are possible. Examples of other versions include orienting the layers in different fashion. Therefore, the spirit and scope of the appended claims should not be limited to the description of versions included herein.

In the accompanying drawings, like reference numbers indicate like elements. FIG. 1 illustrates a perspective view of a dual-band wide-angle absorber/thermal emitter, according to embodiments of the invention. Reference character 100 depicts an apparatus of embodiments of the invention. The apparatus 100, a dual-band wide-angle absorber/thermal emitter is an absorber/emitter that may also be referred to as a bi-layer absorber/emitter.

The apparatus 100 is viewed relative to the x-axis 102, y-axis 104, and z-axis 106. A radiation wave vector, k, 108 is shown. An emission/absorption angle, θ, 110 is the angle between the z-axis 106 and the radiation wave vector 108.

Embodiments of the invention generally relate to an absorber/emitter, including at least one primary layer 112 having a permittivity described by the Drude-Lorentz model. At least one reflective secondary layer 114 is associated with the at least one primary layer 112.

A natural dielectric material may be used as the primary layer 112, such as, for example, glass, silicon carbide (Si—C), diamond, silicon, and silica.

An engineered material may also be used as the primary layer 112. Appropriate examples of suitable engineered materials include composites and metamaterials. The association between the primary 112 and secondary 114 layers is by bonding.

Another embodiment of the invention generally relates to a bi-layer absorber/emitter, including, at least one natural dielectric layer 112. The natural dielectric layer 112 has a permittivity described by the Drude-Lorentz model. At least one reflective layer 114 is bonded to the natural dielectric layer 112. The natural dielectric layer 112 is silicon carbide.

In yet another embodiment, the invention generally relates to a bi-layer absorber/emitter, including, at least one engineered material layer 112 having a permittivity described by the Drude-Lorentz model. At least one reflective layer 114 is bonded to the engineered-material layer 112.

In yet another embodiment, the invention generally relates to an absorber/emitter, including: a silicon carbide layer 112. The thickness of the silicon carbide layer 112 is less than one-tenth of the absorption wavelength of the absorber/emitter. A copper layer 114 is bonded to the silicon carbide layer 112. The silicon carbide layer 112 has a permittivity described by the Drude-Lorentz model.

In embodiments, the primary layer 112 may be referred to as the natural dielectric layer or engineered material layer without detracting from the merits or generality of embodiments of the invention. Additionally, although depicted as a single layer in FIG. 1, the primary layer 112 and the reflective secondary layer 114 may include additional layers. Likewise, the reflective secondary layer 114 may be referred to as the reflective layer without detracting from the merits or generality of embodiments of the invention.

In embodiments, layer thicknesses are based on application-specific conditions and are affected by material electromagnetic wavelengths. The thickness of the primary layer 112 is less than one-tenth of the absorption wavelength of the absorber/emitter (also referred to as bi-layer absorber/emitter).

In embodiments, numerous orientations of the apparatus 100 and respective layers 112 and 114 are possible dependent on the direction of the radiation wave vector, k, 108.

In embodiments, dual-band wide-angle absorption occurs at a shorter and a longer wavelength band. The shorter and longer bands reside at different sides of the Drude-Lorentz frequency. The longer wavelength band is polarization insensitive and is associated with a surge of refractive index near the Lorentzian resonance. High absorption can exist for a broad range of angles with a minimal shift in the center frequency which can be tuned by tuning the Drude-Lorentz resonance. The shorter wavelength band results from the $\in$-near-zero effect occurring for p-polarized waves as the result of field enhancement due to the continuity of the electric displacement field normal to the surface. From the absorption spectrum of the structure, the emission property can be deduced using Kirchoff's law which directly relates the absorptance with the emissivity. The absorption can be calculated from the Poynting vector by solving Maxwell's equations. The desired emission peak and spectral features can be engineered by properly tuning the resonant frequency and the damping factor. This feature was demonstrated in simulated silicon carbide/copper bi-layers.

Experimental results demonstrate the emissivity of a silicon carbide (SiC)/copper (Cu) bilayer as a function of wavelength and emission angle. Both bands were observed to have high emissivity for wide ranges of angles.

Perfect emissivity is used to describe emissivity equal to one at a particular wavelength. Similarly, perfect absorptance is used to describe absorption equal to one at a particular wavelength. FIG. 2A is a graphical comparison of emissivity as a function of emission angle at the perfect emission wavelength of the shorter wavelength band ($\lambda$=10.31 µm), according to embodiments of the invention, and depicted as reference character 200. FIG. 2B is a graphical comparison of emissivity as a function of emission angle at the perfect emission wavelength of the longer wavelength band ($\lambda$=12.84 µm), according to embodiments of the invention, and depicted as reference character 230. Reference characters 272 and 274 depict the shorter and longer wavelength bands discussed above and illustrated in FIG. 2C. FIG. 2C is a graphical comparison of emissivity as a function of wavelength at one perfect emission angle ($\theta$=42.2°), according to embodiments of the invention, and depicted as reference character 270.

As shown in FIG. 2C, the shorter wavelength band 272 has a smaller wavelength than the longer wavelength band 274, hence the designation of shorter and longer, respectively. The shorter wavelength band 272 and the longer wavelength band 274 may also be referred to as a first and a second wavelength band, respectively.

In embodiments, the reflective secondary layer 114, also referred to as reflective layer, is selected from the group consisting of natural reflective materials and engineered reflective materials. Examples of natural reflective materials include metals in the long wavelength region such as, for example, infrared, microwave, and radio frequency waves. Examples of engineered reflective materials include photonic bandgap materials and metamaterials. Other materials may be used without detracting from the merits or generality of embodiments of the invention.

In embodiments, the mechanism of absorption in bi-layer absorbers/emitters is the interaction between resonant transmission and reflection. In other words, the primary layer 112 outputs resonant transmission signals while the secondary layer 114 acts as a mirror to strongly or totally reflect the transmission signals of the primary layer. Therefore, absorption can occur as the consequence of multiple resonant transmission and total reflection, resulting in repeated absorption.

Embodiments of the invention yield two absorption band outputs. Thus, dual-band wide-angle absorption/thermal emission is demonstrated around the Drude-Lorentz resonance in bi-layer absorbers/emitters. Many engineered materials including nanoplasmonic composite structures and metamaterials can be effectively described by the Drude-Lorentz mode, thus embodiments of the invention are applicable for a broad range of materials. The geometry allows easy integration and the dual-band emission/absorption is a desired feature for multi-functional devices including, but not limited to, thermal emitters, IR sensors, photodetectors, absorbers, and bolometers.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An absorber/emitter, comprising:
   at least one primary layer having a permittivity described by the Drude-Lorentz model;
   at least one least one reflective secondary layer associated with said at least one primary layer;
   wherein dual-band wide-angle absorption occurs at a shorter and a longer wavelength band, wherein said shorter and longer wavelength band reside at different sides of the Drude-Lorentz frequency, wherein said longer wavelength band is polarization insensitive and is associated with a surge of refractive index near the Lorentz resonance, and wherein said shorter wavelength band results from the $\in$-near-zero effect occurring for p-polarized waves.

2. The absorber/emitter according to claim 1, wherein the thickness of said at least one primary layer is less than one-tenth of the absorption wavelength of said absorber/emitter.

3. The absorber/emitter according to claim 1, wherein said at least one primary layer is a natural dielectric material.

4. The absorber/emitter according to claim 1, wherein said at least one primary layer is an engineered material.

5. The absorber/emitter according to claim 1, wherein said association between said at least one primary layer and said at least one reflective secondary layer is by bonding.

6. The absorber/emitter according to claim 1, wherein said at least one reflective secondary layer is selected from the group consisting of natural reflective materials and engineered reflective materials.

7. A bi-layer absorber/emitter, comprising:
   at least one natural dielectric layer, wherein said at least one natural dielectric layer has a permittivity described by the Drude-Lorentz model;
   at least one reflective layer bonded to said at least one natural dielectric layer;
   wherein dual-band wide-angle absorption occurs at a shorter and a longer wavelength band, wherein said shorter and longer wavelength band reside at different sides of the Drude-Lorentz frequency, wherein said longer wavelength band is polarization insensitive and is associated with a surge of refractive index near the Lorentz resonance, and wherein said shorter wavelength band results from the $\in$-near-zero effect occurring for p-polarized waves.

8. The bi-layer absorber/emitter according to claim 7, wherein the thickness of said at least one natural dielectric layer is less than one-tenth of the absorption wavelength of said bi-layer absorber/emitter.

9. The bi-layer absorber/emitter according to claim 7, wherein said at least one natural dielectric layer is silicon carbide.

10. The bi-layer absorber/emitter according to claim 7, wherein said at least one reflective layer is selected from the group consisting of natural reflective materials and engineered reflective materials.

11. A bi-layer absorber/emitter, comprising:
    at least one engineered-material layer having a permittivity described by the Drude-Lorentz model;
    at least one reflective layer bonded to said at least one engineered-material layer;
    wherein dual-band wide-angle absorption occurs at a shorter and a longer wavelength band, wherein said shorter and longer wavelength band reside at different sides of the Drude-Lorentz frequency, wherein said longer wavelength band is polarization insensitive and is associated with a surge of refractive index near the Lorentz resonance, and wherein said shorter wavelength band results from the $\in$-near-zero effect occurring for p-polarized waves.

12. The bi-layer absorber/emitter according to claim 11, wherein the thickness of said at least one engineered-material layer is less than one-tenth of the absorption wavelength of said bi-layer absorber/emitter.

13. The bi-layer absorber/emitter according to claim 11, wherein said at least one engineered-material layer is a composite.

14. The bi-layer absorber/emitter according to claim 11, wherein said at least one reflective layer is selected from the group consisting of natural reflective materials and engineered reflective materials.

* * * * *